Patented Aug. 15, 1944

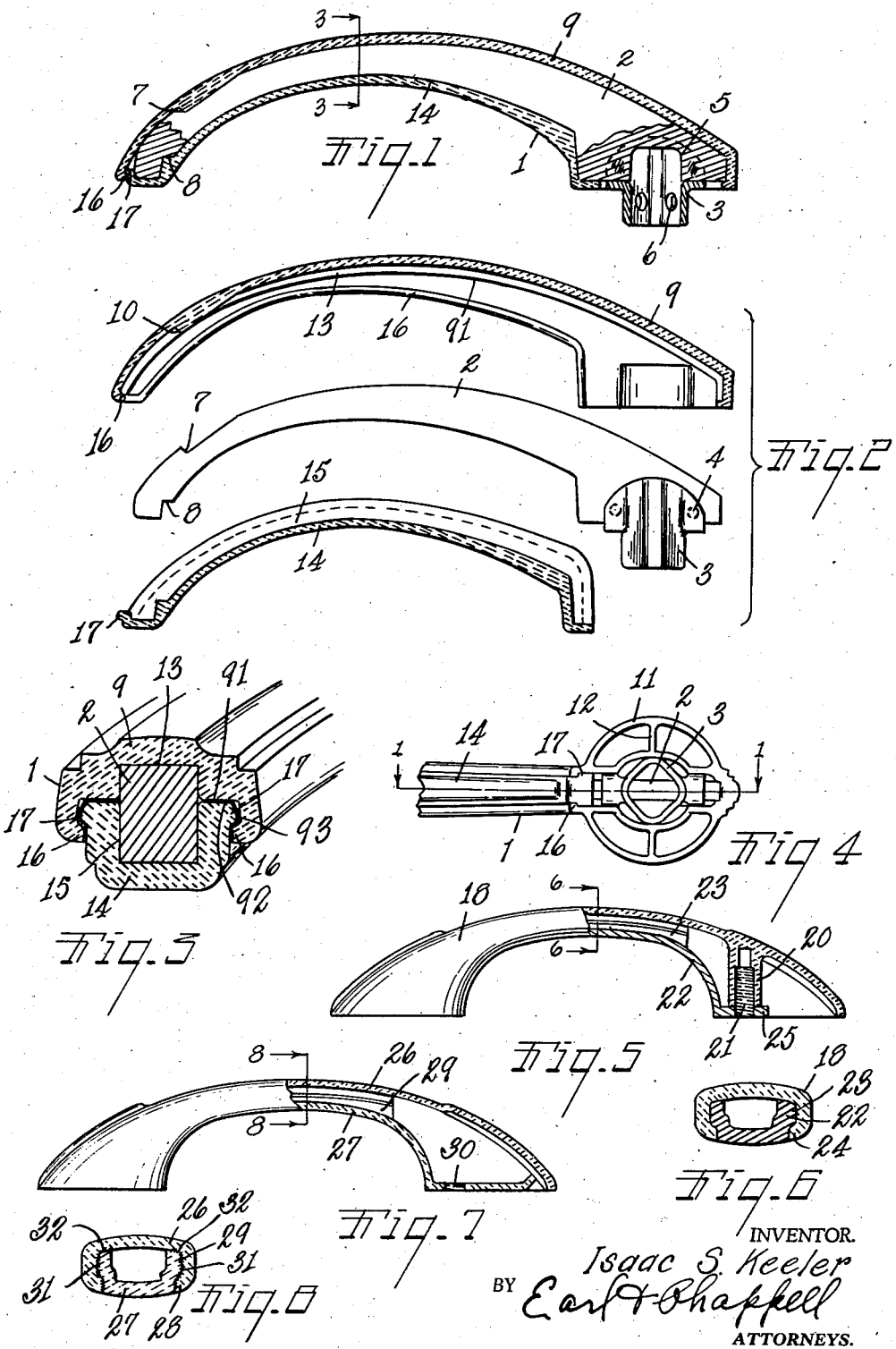

2,355,978

UNITED STATES PATENT OFFICE 2,355,978

DOOR HANDLE OR THE LIKE

Isaac S. Keeler, Grand Rapids, Mich., assignor to Keeler Brass Company, Grand Rapids, Mich., a corporation of Michigan Application May 29, 1941, Serial No. 395,723

6 Claims. (Cl. 18—59)

This invention relates to improvements in door handles or the like.

The main objects of this invention are:

First, to provide a door handle, remote control handle, drawer handle or pull which is highly ornamental and attractive in appearance and at the same time strong and durable.

Second, to provide a handle, or the like, the exposed parts of which are of plastic material.

Third, to provide a structure having these advantages which may be very economically produced both in the matter of forming the parts and the assembling thereof.

Fourth, to provide an improved method of forming handles or the like for plastic casing members.

Objects relating to details and economies of the invention will appear from the description to follow. The invention is defined and pointed out in the claims.

Preferred embodiments of the invention are illustrated in the accompanying drawing, in which:

Fig. 1 is a view mainly in longitudinal section on line 1—1 of Fig. 4, of a door handle embodying the features of my invention, the handle bar being shown partially by full lines.

Fig. 2 is an exploded bracketed view illustrating the parts of the handle prior to assembly thereof, the casing members being shown in longitudinal section.

Fig. 3 is an enlarged fragmentary perspective view sectioned on line 3—3 of Fig. 1.

Fig. 4 is a fragmentary bottom view illustrating the relation of the handle bar or core member and the coacting casing members.

Fig. 5 is a view in side elevation partially broken away and partially in longitudinal section illustrating the features of my invention as embodied in the drawer pull type of handle.

Fig. 6 is an enlarged view in section on line 6—6 of Fig. 5.

Fig. 7 is a view generally similar to that of Fig. 5 illustrating my invention as embodied in a further form of drawer pull type of handle.

Fig. 8 is an enlarged section on line 8—8 of Fig. 7.

Referring to the drawing, the numeral 1 in general indicates a door operating handle embodying the features of my invention. This handle includes a longitudinally curved core or handle bar 2 provided with a socket member 3 which is formed to embrace the base of the bar and secured thereto by spot-welding as indicated at 4. This handle bar has a recess 5 in alignment with the opening in the socket 3 and is ordinarily of rectangular or non-circular section to receive a correspondingly shaped door operating spindle or chill, not shown.

The handle bar or core is shown in side elevation in Fig. 2 and it will be noted that it is provided with notches or recesses 7 and 8 on its upper and lower edges adjacent the tips thereof which receive suitable lugs or projections on the casing members to be described. This engagement acts to effectively secure the parts and resist relative movement as well as to facilitate assembling operation.

I provide an outer casing member 8 formed of moldable plastic material. I have found "Tenite" to be a very satisfactory material and this may be had in a great variety of colors and marbling effects. There are other known plastics, however, that might be used.

The member 9 is molded in U-channel cross section and of such longitudinal curvature as to fittingly receive the handle bar 2. It will be noted that it has an inwardly projecting lug 10 engaging the recess or notch 7 in the handle bar. The outer casing member is formed of internal steps or shoulders 91 in this preferred embodiment illustrated.

Referring to Fig. 4, it will be noted that the spindle or socket extremity of the casing member 9 is provided with an enlargement 11 having an integral web or spider structure 12 connecting the same to the main or body portion of the member 9. This enlargement adds to the appearance of the article as well as constituting a reinforcing means.

The mid-portion 13 of the channel or outer casing member fits or embraces the outer portion of the handle bar, the shoulders 91 being at each side of the handle bar.

The inner casing member 14 in this embodiment illustrated is also formed of plastic material and is of channel cross section and conformed to embrace the handle bar, the edges of the inner member being in abutting relation to the shoulders 91 when the casing members are telescoped together, as shown in Fig. 3. The channel 15 of the inner member is of such cross section that the member has a close fitting relation to the handle bar.

The outer casing member is conformed to provide an inwardly turned flange or rib 16 along its edges, this rib extending across the tip and to the heel of the handle.

The inner member is provided with longitudinal ribs 17 on its side walls with which the ribs 16 may be engaged, the walls of the outer member being springable to permit this engagement.

In the assembling of the parts, the core is placed in proper relation to one of the casing members and the other casing member then telescoped with the one upon the core which results in the ribs 16 snapping over the ribs or shoulders 17 which provides a very effective engagement. However, I preferably further secure the casing members by means of autogenous fused joints or connections, solvent for the plastic being preferably applied to the shoulders 91 or the edges 92 of the inner member 14 and also preferably along the contacting side portions 93, thus resulting in fused joint connections as is indicated by cross hatching at these points. The coengaging ribs retain the parts so that it is unnecessary to apply clamps during this step of manufacture. This not only speeds up the assembling process but also permits the application of the solvent to inner areas of the members to be joined so that there is no disfiguring of the external surfaces and no finish polishing required. However, the snapping springing engagement of the parts is very effective in retaining them even without the adhesive joint as the casing parts are well supported by each other and by the handle bar.

The product is very attractive in appearance and, as stated, may be quite inexpensively produced with a great variety of designs and colors and it eliminates the need for finish plating and finishing steps of the casing members required when metals are used.

In Figs. 5 and 6, I illustrate my invention as embodied in a drawer pull in which the outer casing member 18 is of molded or suitable plastic material in suitable design or outline. This handle member has internal inwardly projecting pillars or posts 20 which are tapped at 31 for the reception of securing screws. This handle member 18 is of channel section and embraces the stamped inner member or backing plate 22, the sides of which are conformed to the outline of the member 18 and are provided with longitudinal beads or shoulders 23, see Fig. 6. The outer member has inturned ribs 24 which engage with the shoulders 23. The member 18, in this embodiment, is springable for permitting telescoping engagement and the snap retaining engagement of the rib and shoulder parts. It will be noted that the post or pillar 20 is cut backwards somewhat for the reception of an ear 25 on the backing plate so as to enable the surface of the latter to lie flush with the lower surface of the member 18. This ear may be internally threaded, like the post, to increase the effectiveness of the attaching means.

In Figs. 7 and 8, I illustrate a further embodiment of my invention in a drawer pull. In this embodiment, both members 26 and 27 are formed of plastic material. As illustrated in Fig. 8, the members 26 and 27 have coacting internal and external ribs or shoulders 28 and 29 which have springing or snap engagement when the parts are assembled. The member 27 is cored or drilled and tapped at 30 for the reception of a securing screw. Prior to assembling the parts of the embodiments of Figs. 7 and 8, I preferably apply a suitable solvent to the internal surfaces, thus providing autogenous fused joints as indicated at 31 and 32.

Structures embodying my invention may be produced in a wide variety of designs and colors at relatively small cost and the fabrication and assembly of the parts is quite inexpensive. The employment of metal is minimized, this not only resulting in the saving of certain metals which is a desirable feature at the present time but also the plating and finishing steps are avoided. With suitable molds, materials such as "Tenite" may be employed so that no polishing steps are required.

I have illustrated and described my improvements in embodiments which I have found very satisfactory. I have not attempted to illustrate various other embodiments or adaptations which I contemplate as it is believed that this disclosure will enable those skilled in the art to embody or adapt my improvements as may be desired.

It should be understood that the terminology used is used descriptively rather than in a limiting sense and with the intention to include equivalents of the features shown and described within the scope of the following claims.

Having thus described my invention, what I claim as new and desire to secure by Letters Patent is:

1. In a handle, the combination of a longitudinally curved handle bar of rectangular section having spindle engaging means at its inner end and recesses on its outer and inner edges adjacent the tip thereof, an outer casing member formed of plastic material and being of internally shouldered channel cross section fittingly receiving the outer edge of said handle bar with the internal shoulders facing inwardly at each side thereof, the sides of said outer casing member being springable and terminating in inturned ribs extending throughout the length and across the tip thereof, said outer casing member having a lug engaging said recess in the outer edge of said handle bar, and an inner casing member formed of plastic material and being of channel section fittingly receiving the inner edge of said handle bar and projecting into said outer casing member with its edges in abutting relation with the shoulders thereof and having external ribs on its sides and outer end with which the said internal ribs of said outer casing member have springing engagement, said inner casing member having a lug engaging said recess in the inner edge of said handle bar.

2. In a handle, the combination of a longitudinally curved handle bar of rectangular section having spindle engaging means at its inner end, an outer casing member formed of plastic material and being of internally shouldered channel cross section fittingly receiving the outer edge of said handle bar with the internal shoulders facing inwardly at each side thereof, the sides of said outer casing member being springable and terminating in inturned ribs extending throughout the length and across the tip thereof, and an inner casing member formed of plastic material and being of channel section fittingly receiving the inner edge of said handle bar and projecting into said outer casing member with its edges in abutting relation with the shoulders thereof and having external ribs on its sides and outer end with which the said internal ribs of said outer casing member have springing engagement.

3. In a handle, the combination of a handle bar, an outer casing member formed of plastic material and being of internally shouldered channel cross section fittingly receiving the outer edge of said handle bar with the internal shoulders facing inwardly at each side thereof, the walls of said outer casing member being springable and terminating in inturned ribs, and an inner casing member of channel section fittingly receiving the inner edge of said handle bar, said inner casing projecting into said outer casing member into engagement with the internal shoulders on the latter and having external ribs with which the said internal ribs of said outer casing member have springing engagement.

4. In a handle, the combination of a handle bar constituting a longitudinally extending rigid core member, an outer casing member formed of plastic material of channel cross section in nesting supported relation to said handle bar, the walls of said outer casing member being springable and provided with internal ribs, and an inner casing member of channel cross section in nesting supporting relation to said handle bar and projecting into said outer casing member and having external ribs with which the internal ribs of said outer casing member have springing engagement to retain the outer and the inner casing members in nesting engagement with said bar.

5. A handle comprising a longitudinally extending metal core adapted to be connected to an operating element, a hollow molded plastic outer member engaging one side of said core, and a hollow molded plastic inner member engaging the other side of said core and overlapping relative to the sides of said outer member, said members conforming in outline to and encasing said core and being provided with coacting external and internal side ribs and shoulders having retaining snap engagement in their overlapping relation to retain the outer and the inner members in nestled engagement with said metal core.

6. The method of making handles and the like comprising the steps of molding inner and outer members of plastic material conformed for telescoping assembly engagement and provided with coengaging retaining ribs, one of the members being springable permitting snap engagement of the said ribs when the members are telescopingly assembled, applying a solvent to parts constituting contacting interior parts of the assembly, and telescoping the parts to engage said ribs, the parts being retained by such engagement during the joint forming fusing action of the solvent.

ISAAC S. KEELER.